US011293787B2

(12) United States Patent
Kimoto

(10) Patent No.: US 11,293,787 B2
(45) Date of Patent: Apr. 5, 2022

(54) HOUSING STRUCTURE FOR STEERING APPARATUS

(71) Applicant: HITACHI AUTOMOTIVE SYSTEMS, LTD., Hitachinaka (JP)

(72) Inventor: Susumu Kimoto, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 415 days.

(21) Appl. No.: 16/554,466

(22) Filed: Aug. 28, 2019

(65) Prior Publication Data

US 2020/0088553 A1    Mar. 19, 2020

(30) Foreign Application Priority Data

Sep. 13, 2018  (JP) .............................. JP2018-171211

(51) Int. Cl.
  *G01D 11/24* (2006.01)
  *B62D 15/02* (2006.01)
(52) U.S. Cl.
  CPC ........ *G01D 11/245* (2013.01); *B62D 15/0225* (2013.01)

(58) Field of Classification Search
  CPC .......................... G01D 11/245; B62D 15/0225
  See application file for complete search history.

(56) References Cited

U.S. PATENT DOCUMENTS

| | | | |
|---|---|---|---|
| 4,718,514 A * | 1/1988 | Hirakushi | ................ B62D 6/02 180/422 |
| 2017/0225707 A1* | 8/2017 | Tomizawa | ............... H02K 5/10 |
| 2018/0001923 A1* | 1/2018 | Yamasaki | ............... F16H 57/02 |
| 2019/0071116 A1* | 3/2019 | Sasaki | .................. B62D 5/0463 |
| 2021/0269084 A1* | 9/2021 | Hamaguchi | ............. H02K 5/10 |

FOREIGN PATENT DOCUMENTS

JP          2017-185966 A       10/2017

* cited by examiner

*Primary Examiner* — Jamel E Williams
(74) *Attorney, Agent, or Firm* — Foley & Lardner LLP

(57) ABSTRACT

In a housing structure for a steering apparatus, a first seal holding portion 50B is formed to a first sensor housing 50 and a second seal holding portion 51B is formed to a second sensor housing 51, and in a state in which the first sensor housing 50 is combined with the second sensor housing 51, a seal ring 55 is held between the first seal holding portion 50B and the second seal holding portion 51B, and recessed space parts 56A to 56D for storing moisture is formed on the radial outer side of the second seal holding portion 51B when viewed in the rotation axis of a steering shaft 4.

12 Claims, 8 Drawing Sheets

HOUSING STRUCTURE FOR STEERING APPARATUS

BACKGROUND

The present invention relates to a steering apparatus mounted on a vehicle, and particularly to a housing structure of a steering apparatus accommodating a torque sensor, a rotation angle sensor and the like provided to a steering shaft.

In a steering apparatus, a so-called electric power steering apparatus has been known in which, separately from the driving of the turning shaft by a steering shaft rotated by a steering wheel, a rotation angle, a rotation direction, and a rotation torque of a steering shaft are detected, and by, based on their detection signals, rotating an electric motor and transmitting the rotation of the electric motor to a nut to drive the turning shaft accommodated in the nut, a steering force is assisted. Such an electric power steering apparatus is disclosed by, for example, Japanese Patent Application Publication No. 2017-185966 (hereinafter is referred to as "JP2017-185966").

In such an electric power steering apparatus, to detect the rotation torque and the rotation angle of the steering shaft, a torque sensor and a rotation angle sensor are provided to a part of the steering shaft. In addition, to protect these sensors from collision of foreign matters and being wetted with water such as rainwater and salt water, a housing covering these sensors from the outside is attached.

As shown in FIG. 1 of JP2017-185966, a housing for protecting sensors is configured of a sensor housing formed to a part of a rack housing for accommodating a rack bar, and of a sensor cover fixed to the sensor housing by fixing bolts.

Then, a steering shaft is provided so as to pass through the internal space formed by the sensor housing and the sensor cover, and a pinion provided on the distal end side of the steering shaft engages with the rack bar. Moreover, the sensors are contained in the internal space formed by the sensor housing and the sensor cover. In addition, as shown in FIG. 1 of JP2017-185966, a sensor cover of a related art is formed of a flat plate having a predetermined thickness, and is fixed to the sensor housing such that the flat plate is brought into tight contact with the end surface of the sensor housing.

SUMMARY

However, there is a case where such a housing for protecting sensors is wet with water such as rainwater and salt water because it is disposed on the bottom side of a vehicle. Consequently, rainwater or salt water infiltrates into a narrow gap between contact surfaces of the sensor cover and the sensor housing by a capillary phenomenon. If the number of times of the infiltration of rainwater or salt water is small, it causes no serious problem. However, in particular, if the number of times of the infiltration of salt water becomes large, salinity concentration becomes high because the previous residual salts are melt, the corrosion of the contact surfaces of the sensor cover and the sensor housing proceeds, and then, salt water or rainwater finally infiltrates into the inside of the housing. Therefore, a technique to suppress the infiltration of rainwater or salt water into the inside of the housing for protecting the sensors is required.

In view of the foregoing, for suppressing the infiltration of moisture, such as rainwater and salt water, into the inside of the housing for protecting the sensors, it is desirable to improve a housing structure of a steering apparatus which is capable of suppressing the infiltration of moisture, such as rainwater and salt water, into the inside of the housing.

According to one aspect of the present invention, a housing structure for a steering apparatus, comprises: a first housing member including a first housing body and a first housing seal member holding portion; and a second housing member made of resin material, and including a second housing body, a second housing seal member holding portion and a recessed space, wherein the first housing body has a cylindrical shape, and includes a first equipment accommodation space thereinside, wherein the first equipment accommodation space accommodates a part of a steering shaft, wherein the first housing seal member holding portion has a cylindrical shape, and is provided to the first housing body, wherein the second housing body has a cylindrical shape, and includes a second equipment accommodation space thereinside, wherein the second equipment accommodation space accommodates a part of the steering shaft provided so as to be rotatable in an inside of the second equipment accommodation space, wherein the second housing seal member holding portion has a cylindrical shape, and the first housing seal member holding portion is inserted thereinside, and the second housing seal member holding portion holds an annular seal member between the first housing seal member holding portion and the second housing seal member holding portion in a radial direction to a rotation axis of the steering shaft, and wherein the recessed space is provided more on an outer side than the second housing seal member holding portion in the radial direction to the rotation axis of the steering shaft, and has a shape opening toward the first housing member in a direction of the rotation axis of the steering shaft.

DETAILED DESCRIPTION

In the following, although an embodiment of the present invention will be explained in detail with reference to the drawings, the present invention is not limited to the following embodiments, and includes variations and applications in technical concepts without departing from the scope of the present invention.

Before explaining an embodiment of the present invention, the configuration of an electric power steering apparatus becoming a premise of the present invention will be explained.

Figure 1:
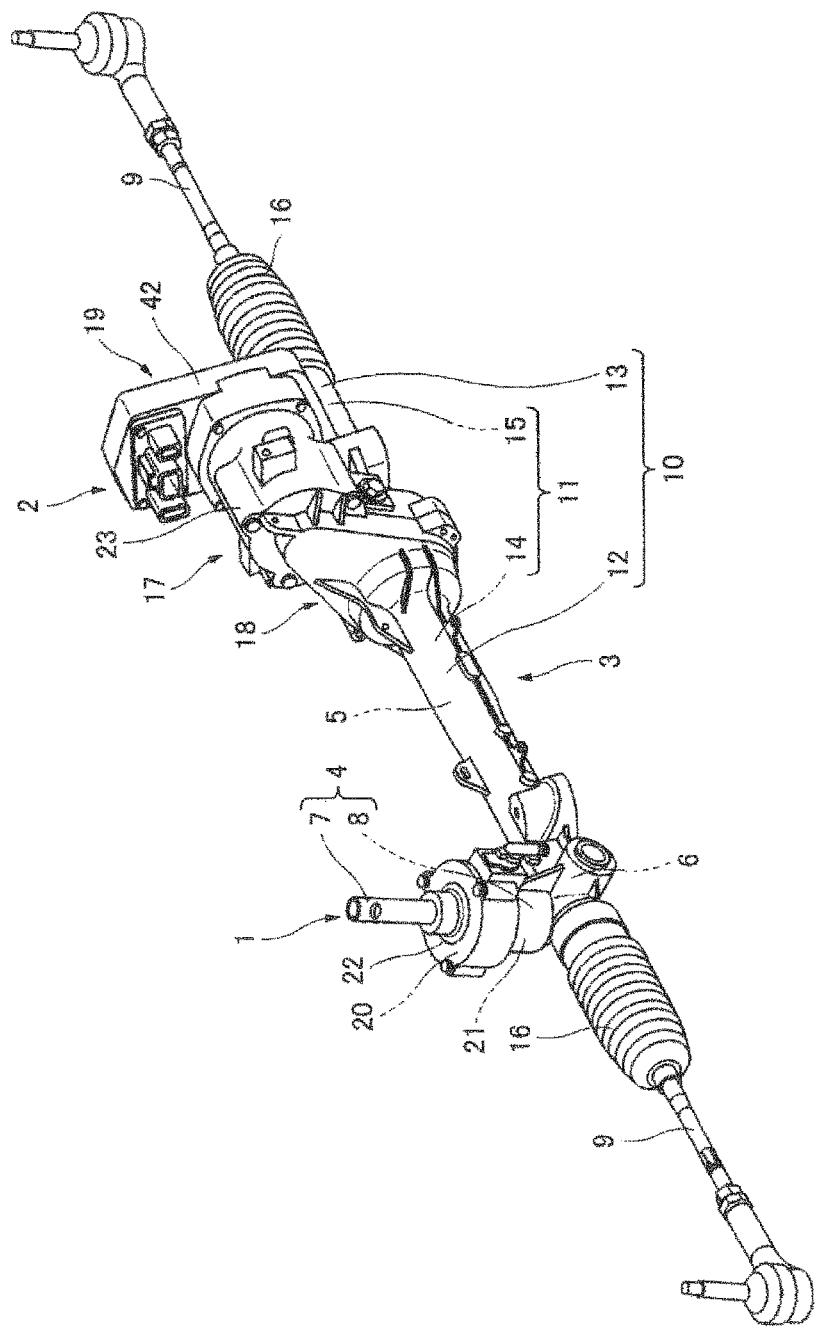
FIG. 1 is a perspective view showing the outer appearance of an electric power steering apparatus.
Figure 2:
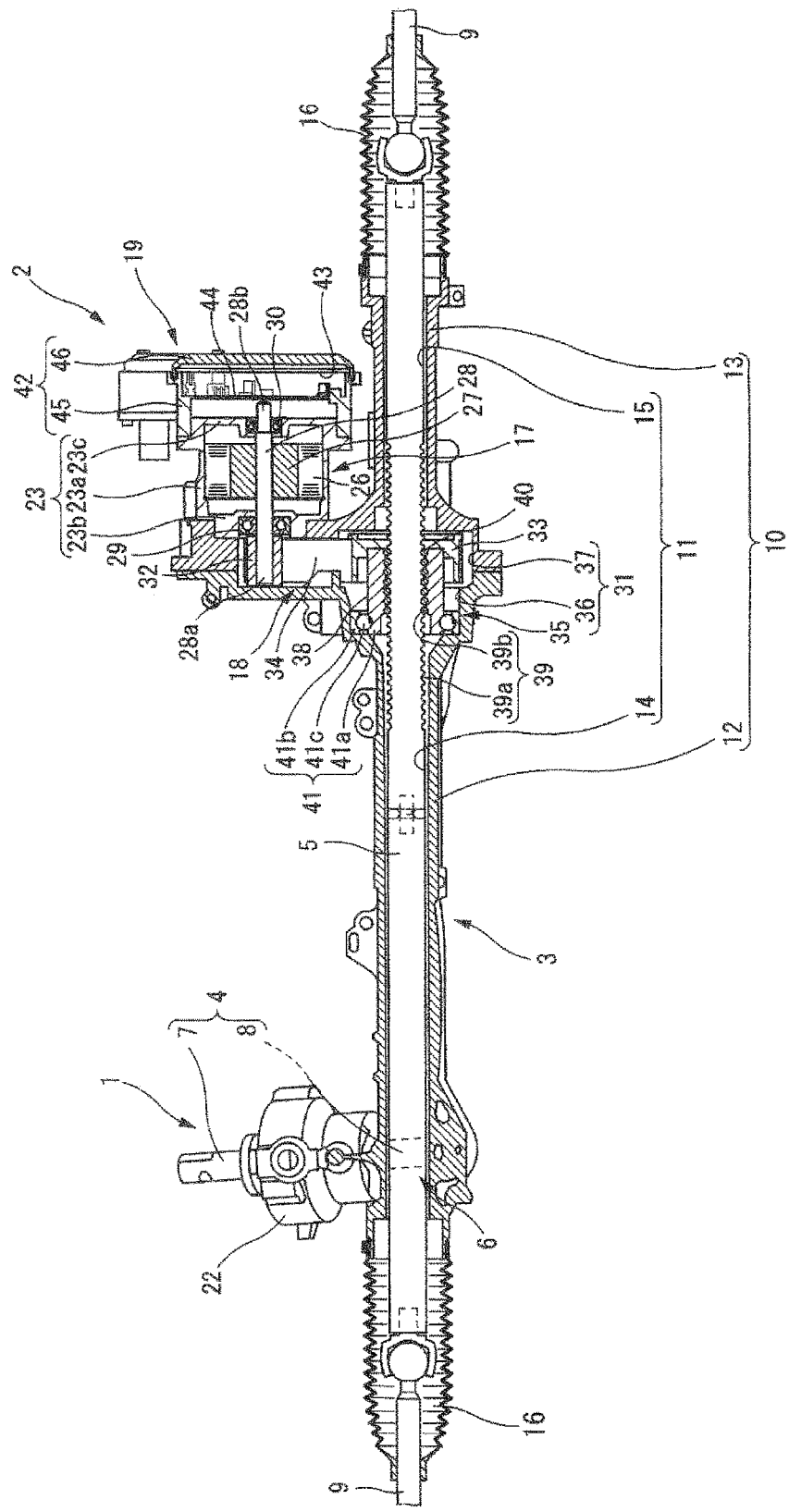
FIG. 2 is a sectional view showing a longitudinal section of the electric power steering apparatus shown in FIG. 1.

FIG. 1 and FIG. 2 each show an electric power steering apparatus in which, separately from the driving of a turning shaft by a steering shaft rotated by a steering wheel, a rotation angle, a rotation direction, and a rotation torque of a steering shaft are detected, and by, based on their detection signals, rotating an electric motor and transmitting the rotation of the electric motor to a nut to drive the turning shaft accommodated in the nut, a steering force is assisted.

In FIG. 1, a steering mechanism 1 is equipped with a steering shaft 4 connected to a steering wheel (not shown in the drawings) disposed in a driving room of a vehicle, a rack bar 5 serving as a turning shaft which is liked with turning wheels, and with a conversion mechanism 6 which links the steering shaft 4 with the rack bar 5.

The conversion mechanism 6 is a so-called rack-pinion mechanism, and is configured of pinion tooth (not shown in the drawings) formed on the distal end side of the steering shaft 4 and a rack tooth (not shown in the drawings) formed on the outer periphery of the rack bar 5.

Here, although the rack bar 5 is shown as a turning member, as a turning member, a pitman arm can be sited in addition to the rack bar 5, and it is not limited to these, and a link mechanism provided between a tuning actuator and the steering wheel can be included.

The steering shaft 4 includes an input shaft 7 whose one end side in the axial direction is integrally rotatably connected to the steering wheel, and an output shaft 8 whose one end side in the axial direction is connected to the other end side in the axial direction of the input shaft 7 through a torsion bar (not shown in the drawings).

Both ends in the axial direction of the rack bar 5 are connected to a pair of the respective turning wheels through tie rods 9 and a pair of knuckle arms. With this, when the rack bar 5 axially moves, each of the knuckle arms is pulled through a corresponding one of the tie rods 9, and the direction of a pair of the turning wheels is changed.

In addition, the rack bar 5 is axially movably accommodated inside a rack bar accommodation portion 11 of a substantially cylindrical rack housing 10 forming a part of the housing 3, in a state in which the both ends in the axial direction of the rack bar 5 are exposed outside. The rack housing 10 is formed by casting and is divided into two parts in the axial direction, and a first housing 12 accommodating one end side in the axial direction of the rack bar 5 and a second housing 13 accommodating the other end side in the axial direction of the rack bar 5 are integrated by being fastened with a plurality of bolts (not shown in the drawings).

In addition, the rack bar accommodation portion 11 is configured of a first rack bar accommodation portion 14 passing through the inside of the first housing 12 in the axial direction, and of a second rack bar accommodation portion 15 passing through the inside of the second housing 13 in the axial direction.

Further, boots 16 each formed in a bellows shape are attached to the respective both ends in the axial direction of the rack housing 10 so as to extend over the respective tie rods 9. Each of these boots 16 is made of an elastic member such as a synthetic rubber material so as to secure a predetermined flexibility, and is provided to suppress the insertion of, for example, water and dust into the inside of the housing 3.

A steering assist mechanism 2 is equipped with an electric motor 17 that is a driving part for generating an steering assist power, a transmission mechanism 18 for transmitting a driving force of the electric motor 17 to the rack bar 5, various sensors for detecting various state quantities of the power steering apparatus, and with a controller 19 for driving and controlling the electric motor 17 based on signals output from the sensors. Here, the electric motor 17 and the transmission mechanism 18 form a steering actuator.

Among the various sensors, a steering angle sensor for detecting a steering angle that is a quantity of the rotation of the steering wheel from a steering neutral angle of the steering wheel and a torque sensor for detecting a torque input to the steering shaft 4 are accommodated in a housing 22 that is a part of the housing 3 and which is formed so as to surround the outer periphery of the steering shaft 4.

The housing 22 for protecting the sensors is configured of a sensor housing 21 formed to a part of the rack housing 10 which accommodates the rack bar 5, and of a sensor cover 20 fixed to the sensor housing 21 by fixing bolts. The sensor cover 20 is formed in a disc shape formed by a flat plate having a predetermined thickness.

The steering angle sensor accommodated in the housing 22 is attached to the outer periphery of the input shaft 7 of the steering shaft 4, and detects a steering angle based on the rotation angle of the input shaft 7. In addition, the steering angle sensor includes dual-system main and sub steering angle detection units, and each of them detects the steering angle.

The torque sensor is also accommodated in the housing 22. This torque sensor is provided so as to be disposed over between the input shaft 7 and the output shaft 8, and detects a torque based on a displacement amount of the relative rotation of the input shaft 7 and the output shaft 8.

In addition, the torque sensor includes dual-system main and sub torque detection units, and each of them detects the steering torque. Further, each of the steering angle sensor and the torque sensor is electrically connected to the controller 19 through a harness (not shown in the drawings) provided along the outer periphery of the rack housing 10.

In FIG. 2, the electric motor 17 is a so-called three-phase AC type motor which is driven based on three-phase AC power, and is equipped with a motor housing 23 forming a part of the housing 3, and a motor element provided inside the motor housing 23. The motor housing 23 includes a cylindrical portion 23a having a cylindrical shape which accommodates the motor element thereinside, and first and second end wall portions 23b and 23c which close the respective opening portions of the cylindrical portion 23a.

The motor element includes a cylindrical stator 26 fixed to the inner peripheral surface of the cylindrical portion 23a by, for example, shrink fitting, a cylindrical rotor 27 disposed on the inner peripheral side of the rotor 26 through a predetermined radial gap, and a motor shaft 28 integrally rotatably fixed on the inner peripheral side of the rotor 27 and inputting the rotation of the rotor 27.

The stator 26 is formed by winding U phase, V phase and W phase coils around a stator core (not shown in the drawings) formed by laminating a plurality of thin plates. In addition, in the present embodiment, although each of the coils is connected by a so-called Y connection (star connection), each of them may be connected by a delta connection.

Both end portions 28a and 28b of the motor shaft 28 are exposed from the motor housing 23 though respective through holes formed by penetrating through the first and second end wall portions 23b and 23c. Among them, the one end portion 28a located on the opposite side to the controller 19 faces the inside of the after-mentioned transmission mechanism accommodation portion 31 accommodating the transmission mechanism 18. On the other hand, the other end portion 28b faces the inside of the after-mentioned accommodation portion 43 accommodating the controller 19.

In addition, the motor shaft 28 is rotatably supported by a first ball bearing 29 provided between the outer peripheral surface on the one end portion 28a side and the inner peripheral surface of the through hole of the first end wall portion 23b, and a second ball bearing 30 provided between the outer peripheral surface on the other end portion 28b side and the inner peripheral surface of the through hole of the second end wall portion 23c.

The transmission mechanism 18 is accommodated inside the transmission mechanism accommodation portion 31 of the housing 3, and includes an input-side pulley 32 and an output-side pulley 33, a belt 34 wound between the pulleys 32 and 33, and a ball screw mechanism 35 for converting the rotation of the output-side pulley 33 to the axial movement of the rack bar 5 while decelerating the rotation thereof.

The transmission mechanism accommodation portion 31 is formed by joining a first transmission mechanism accommodation portion 36 provided to the end portion on the second housing 13 side of the first rack bar accommodation portion 14 and a second transmission mechanism accommodation portion 37 provided to the end portion on the first housing 12 side of the second rack bar accommodation portion 15.

The input-side pulley 32 is formed in a cylindrical shape having a relatively small diameter to the output-side pulley 33, and is press-fitted to the one end portion 28a of the motor shaft 28 of the electric motor 17 through the through hole penetratingly formed on the inner peripheral side.

The output-side pulley 33 is disposed on the outer peripheral side of the rack bar 5, and is linked with the rack bar 5 through the ball screw mechanism 35. In more detail, the output-side pulley 33 has a cylindrical shape having a bottom with a relatively large diameter to the input-side pulley 32, and is fixed to the outer periphery of the after-mentioned nut 38 of the ball screw mechanism 35 so as to rotate integrally with the nut 38.

The belt 34 is an endless belt in which, as a core material, glass fibers and copper wires are buried thereinside, and transmits the rotation force of the input-side pulley 32 to the output-side pulley 33 by synchronously rotating the input-side pulley 32 and the output-side pulley 33.

The ball screw mechanism 35 is equipped with the cylindrical nut 38 disposed on the outer peripheral side of the rack bar 5, a ball circulation groove 39 formed between the nut 38 and the rack bar 5, a plurality of balls 40 rollably disposed inside the ball circulation groove 39, and with a circulation mechanism (not shown in the drawings) for circulating each of the balls 40 from one end side to the other end side of the ball circulation groove 39.

The nut 38 is rotatably supported through the ball bearing 41 accommodated in the first transmission mechanism accommodation portion 36. The ball bearing 41 includes an inner race 41a formed integrally with the nut 38, an outer race 41b fixed to the inner peripheral surface of the first transmission mechanism accommodation portion 36, and a plurality of balls 41c rollably accommodated between the inner race 41a and the outer race 41b. In addition, in the present embodiment, as an example, although the inner race 41a is formed integrally with the nut 38, the inner race 41a may be formed separately from the nut 38.

The ball circulation groove 39 is configured of a shaft-side ball screw groove 39a having a helical groove shape which is provided on the outer peripheral side of the rack bar 5, and of a nut-side ball screw groove 39b having a helical groove shape which is provided on the inner peripheral side of the nut 38.

The controller 19 is equipped with a control housing 42 forming a part of the housing 3, and with a control board 44 accommodated in the accommodation portion 43 of the control housing 42.

The control housing 42 includes a cylindrical body 45 whose one end portion on the electric motor 17 side covers the outer periphery of the motor housing 23, and a cover 46 closing the opening portion on the other end portion side of the body 45.

The control board 44 is formed in a manner such that a conductor pattern is formed on each of the front and rear surfaces of a board made of a non-conductive resin material such as glass epoxy resin, and a plurality of electronic components and electric components are mounted on the conductor pattern.

In addition, although not shown in FIG. 2, a motor rotation angle sensor that is one of the sensors and which detects a motor rotation angle that is a rotation angle of the rotor 27 of the electric motor 17 is provided on the control board 44.

The motor rotation angle sensor detects the rotation angle of the motor shaft 28 (rotor 27) based on a change in a magnetic field generated by a magnet (not shown in the drawings) attached to the other end portion 28b of the motor shaft 28. In addition, the motor rotation angle sensor includes dual-system main and sub motor rotation angle detection units, and each of them detects the rotation angle of the motor shaft 28.

In the electric power steering apparatus mentioned above, as shown in FIG. 1, the conventional sensor cover 20 is formed by a flat plate having a predetermined thickness, and is fixed to the sensor housing 21 such that this flat plate is brought into tight contact with the end surface of the sensor housing 21.

Then, there is a case where such a housing 22 for protecting the sensors is wet with water such as rainwater and salt water because it is disposed on the bottom side of the vehicle. Consequently, rainwater or salt water infiltrates into a narrow gap between contact surfaces of the sensor cover 20 and the sensor housing 21 by a capillary phenomenon. If the number of times of the infiltration of rainwater or salt water is small, it causes no serious problem. However, in particular, if the number of times of the infiltration of salt water becomes large, the corrosion of the contact surfaces of the sensor cover and the sensor housing proceeds, and then, salt water or rainwater finally infiltrates into the inside of the housing.

First Embodiment

The present invention is one to provide a housing structure for a steering apparatus which is capable of solving such a problem. In the following, a first embodiment of the present invention will be explained based on FIG. 3 to FIG. 6.

Figure 3:
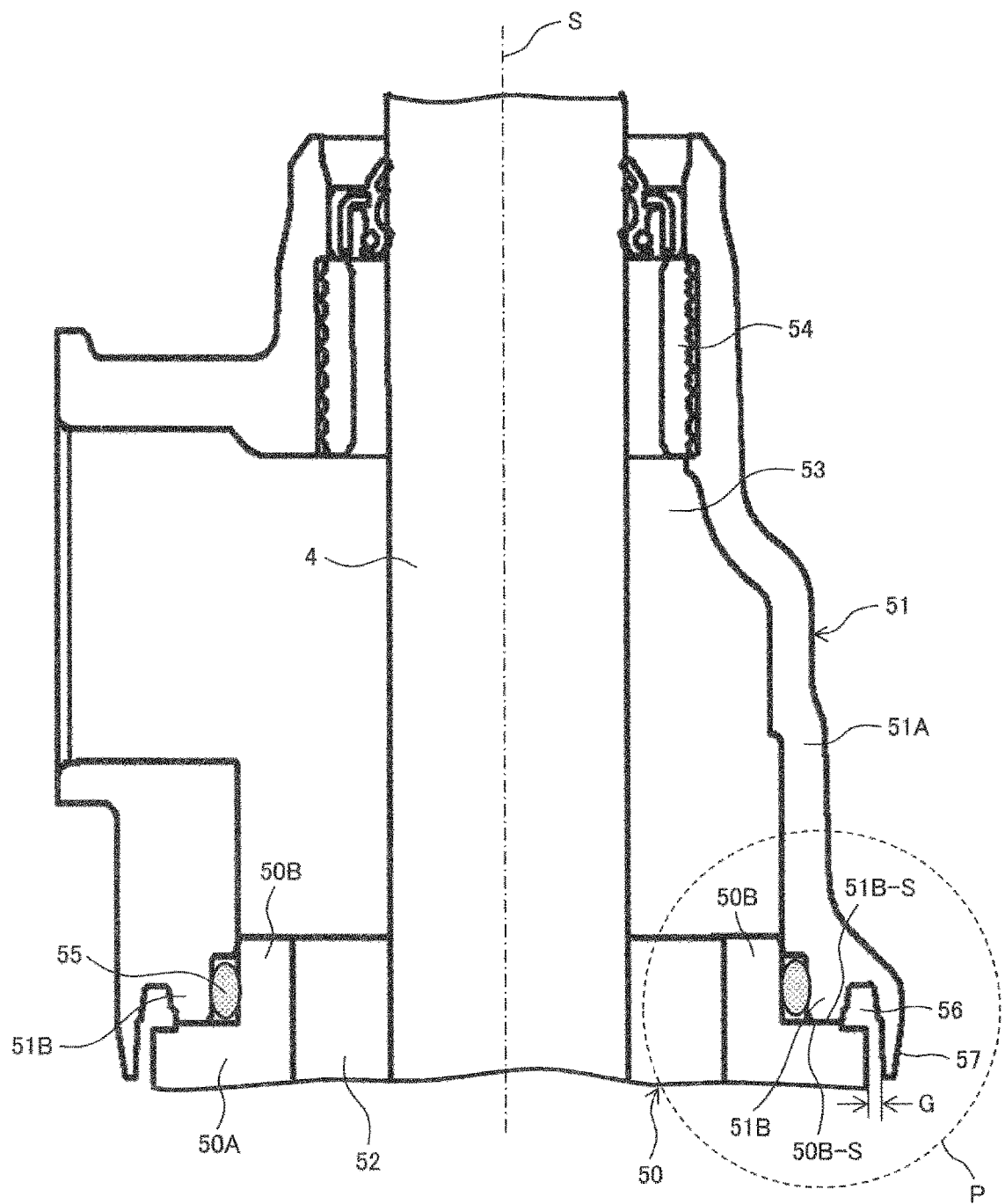
FIG. 3 is a sectional view of a sensor housing provided to a steering shaft which is an embodiment of the present invention.
Figure 4:
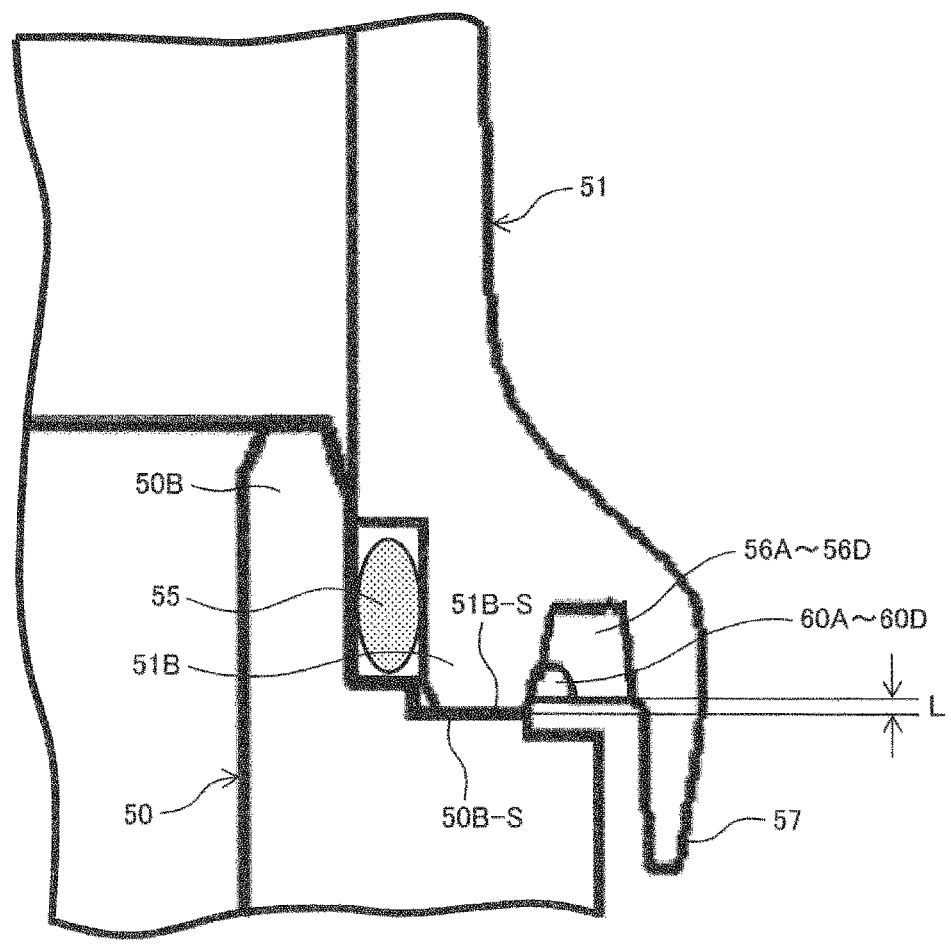
FIG. 4 is an enlarged sectional view of a part P of FIG. 3.

In FIG. 3 and FIG. 4, a housing for protecting sensors is configured of a first sensor housing (first housing member) 50 and a second sensor housing (second housing member) 51. The first sensor housing 50 is made of aluminum alloy, and is formed integrally with a rack housing 10 by casting.

In addition, the second sensor housing 51 is made of synthetic resin such as engineering plastic. This second sensor housing 51 is formed by molding with injection molding.

The first sensor housing 50 is formed of a first sensor housing body 50A and an annular first seal holding portion (first housing seal member holding portion) 50B for holding the after-mentioned seal member. A torque sensor (not shown in the drawings) is accommodated in a first accommodation space (first equipment accommodation space) 52 which is formed in a cylindrical shape and which is formed inside the first sensor housing body 50A.

Similarly, the second sensor housing 51 is formed of a second sensor housing body 51A and an annular second seal holding portion (second housing seal member holding portion) 51B for holding the after-mentioned seal member. A rotation angle sensor 54 is accommodated in a second accommodation space (second equipment accommodation space) 53 which is formed in a cylindrical shape and which is formed inside the second sensor housing body 51A.

The steering shaft 4 passes through the first accommodation space 52 and the second accommodation space 53 in a state of being rotatable, and a pinion is provided to the distal end of the steering shaft 4. The rotation angle sensor 54 is disposed around the steering shaft 4, and although not shown in the drawings, the torque sensor is provided between the input shaft 7 and the output shaft 8 of the steering shaft 4.

The first seal holding portion 50B extends toward the second sensor housing 51 side from the first sensor housing body 50A along the direction of a rotation axis S of the steering shaft 4. Similarly, the second seal holding portion 51B extends toward the first sensor housing 50 side from the second sensor housing body 51A along the direction of the rotation axis S of the steering shaft 4.

Each of the first seal holding portion 50B and the second seal holding portion 51B is formed in an annular cylindrical shape, and when viewed in the radial direction of the steering shaft 4, the second seal holding portion 51B is positioned outside the first seal holding portion 50B. Consequently, the outer peripheral wall of the first seal holding portion 50B and the inner peripheral wall of the second seal holding portion 51B face each other through a predetermined annular gap.

An annular seal ring (seal member) 55 is disposed in the annular gap. The seal ring 55 is disposed in a state of being compressed by the wall surfaces of the seal holding portions 50B and 51B, and thereby liquid-tight function is secured. That is, the wall surfaces of the respective first seal holding portion 50B and the second seal holding portion 51B come in contact with the seal ring 55 in the radial direction to secure sealing performance.

With this, it is possible to suppress the influence of a reaction force against the second sensor housing 51 caused by the compression force of the seal ring 55 to seal performance of a seal part. As the seal ring 55, a material having a high chemical resistance, such as silicone rubber, can be used.

FIG. 3 shows a state in which the end surface of the first sensor housing 50 and the end surface of the second sensor housing 51 butt against each other, and they are fixed by fixing bolts which are not shown in the drawings. In this state, a distal end seal portion (first seal portion) 51B-S of the second seal holding portion 51B is brought into firmly contact with a seal portion 50B-S formed on the end surface of the first sensor housing 50. Here, the distal end seal portion 51B-S of the second seal holding portion 51B and the seal portion 50B-S formed on the end surface of the first sensor housing 50 cooperatively form the seal part.

In this way, the distal end seal portion 51B-S is provided between the seal ring 55 and the after-mentioned recessed space 56 in the radial direction to the rotation axis S of the steering shaft 4, and comes in contact with the seal portion 50B-S of the first sensor housing 50 in the direction of the rotation axis S of the steering shaft 4, thereby sealing between the first sensor housing body 50A and the second sensor housing 51A.

At this time, since the distal end seal portion 51B-S of the second seal holding portion 51B is made of synthetic resin, when the distal end seal portion 51B-S comes in firmly contact with the seal portion 50B-S formed on the end surface of the first sensor housing 50, the distal end surface of the synthetic resin is plastically deformed and compressed, as a result of which seal performance can be secured with this contact part.

Moreover, the distal end seal portion 51B-S has a shape protruding toward the seal portion 50B-S of the first sensor housing body 50A in the direction of the rotation axis S of the steering shaft 4. In this way, in addition to the above-mentioned seal ring 55, by providing the distal end seal portion 51B-S and the seal portion 50B-S, a housing structure having higher liquid-tight performance can be obtained.

Furthermore, when viewed in the radial direction of the steering shaft 4, the recessed space 56 is formed on the end surface of the second sensor housing 51 on the radially outside of the annular second seal holding portion 51B. This recessed space 56 has a shape opening toward the surface on the radially outside of the seal portion 50B-S formed on the end surface of the first sensor housing 50.

In this way, by forming the recessed space 56, in a case where moisture infiltrates from the contact part of the seal portion 50B-S of the first sensor housing 50 and the seal portion 51B-S of the second sensor housing 51, the moisture is stored and held in the recessed space 56 once, and thereby the infiltrating of the moisture to the seal ring 55 is suppressed, and a housing structure having a high liquid-tight performance can be obtained.

Moreover, when viewed in the radial direction of the steering shaft 4, an annular skirt portion 57 is formed on the end surface of the second sensor housing 51 which is located on the outside of the recessed space 56. This skirt portion 57 extends beyond the seal portion 50B-S of the first sensor housing 50 along the direction of the rotation axis S of the steering shaft 4.

With this, it is possible to suppress the direct reaching of the moisture to the space between the seal portion 50B-S of the first sensor housing 50 and the seal portion 51B-S of the second housing 51 from the outside. FIG. 3 is one showing a state close to a state of being mounted on the vehicle, and the side on which the second sensor housing 51 is positioned is defined as a "top side" and the side on which the first sensor housing 50 is positioned is defined as a "bottom side". That is, it is possible to effectively block the moisture infiltrated from the top side. Moreover, if a gap G between the skirt portion 57 and the outside wall surface of the first sensor housing 50 is set to be small, the moisture infiltrated from the bottom side can also be effectively blocked.

In addition, the sectional shape of the skirt portion 57 in a plane surface including the rotation axis S of the steering shaft 4 has a shape becoming thinner as a distance to the first sensor housing 50 decreases in the direction of the rotation axis S. With this, the influence of cooling contraction of the skirt portion 57 at the time of molding the second sensor housing 51 with synthetic resin can be suppressed.

Next, a specific configuration of the recessed space 56 will be explained based on FIG. 4 to FIG. 6. FIG. 4 is one showing an enlarged part P of FIG. 3, FIG. 5 shows a state when the second sensor housing 51 is obliquely viewed, and FIG. 6 shows a state when the second sensor housing 51 is viewed from the opening end side thereof.

Figure 5:
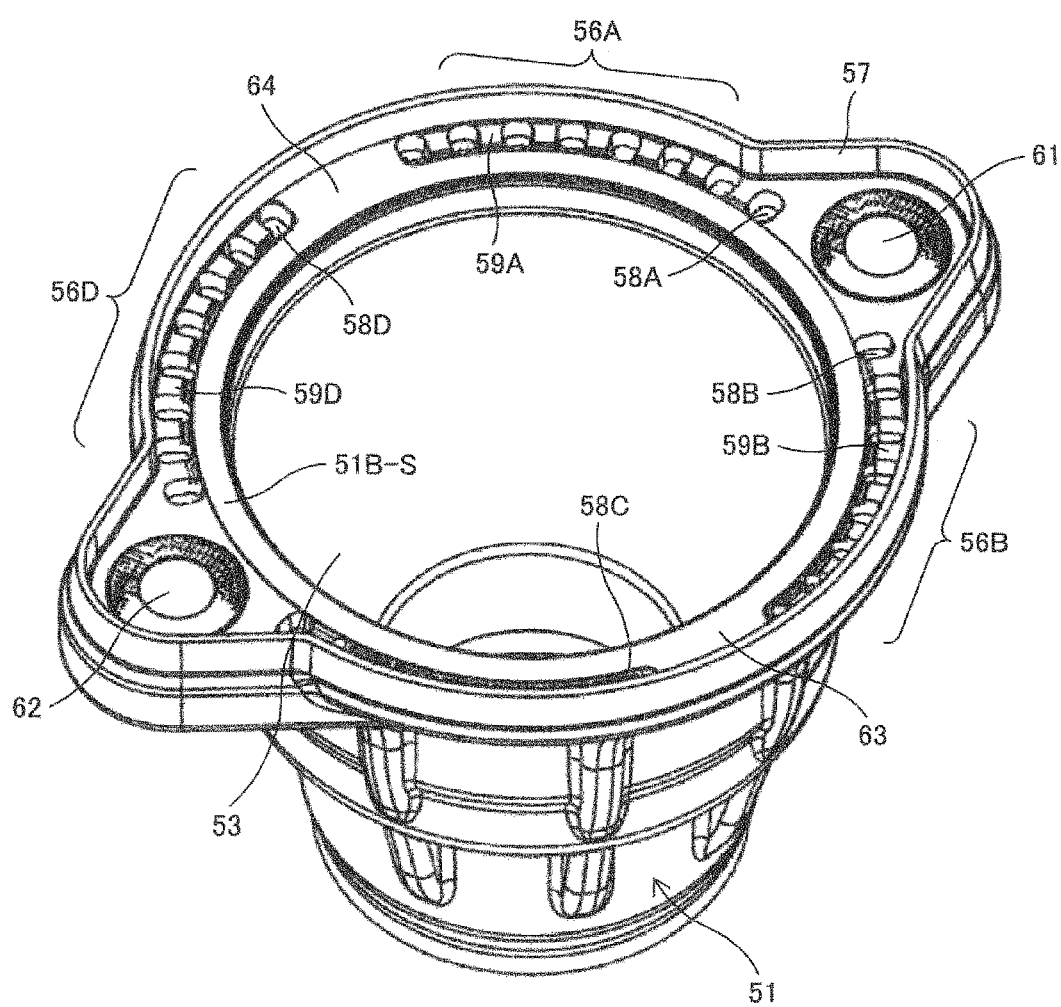
FIG. 5 is a perspective view of a second sensor housing in a first embodiment of the present invention when obliquely viewing the second sensor housing.
Figure 6:
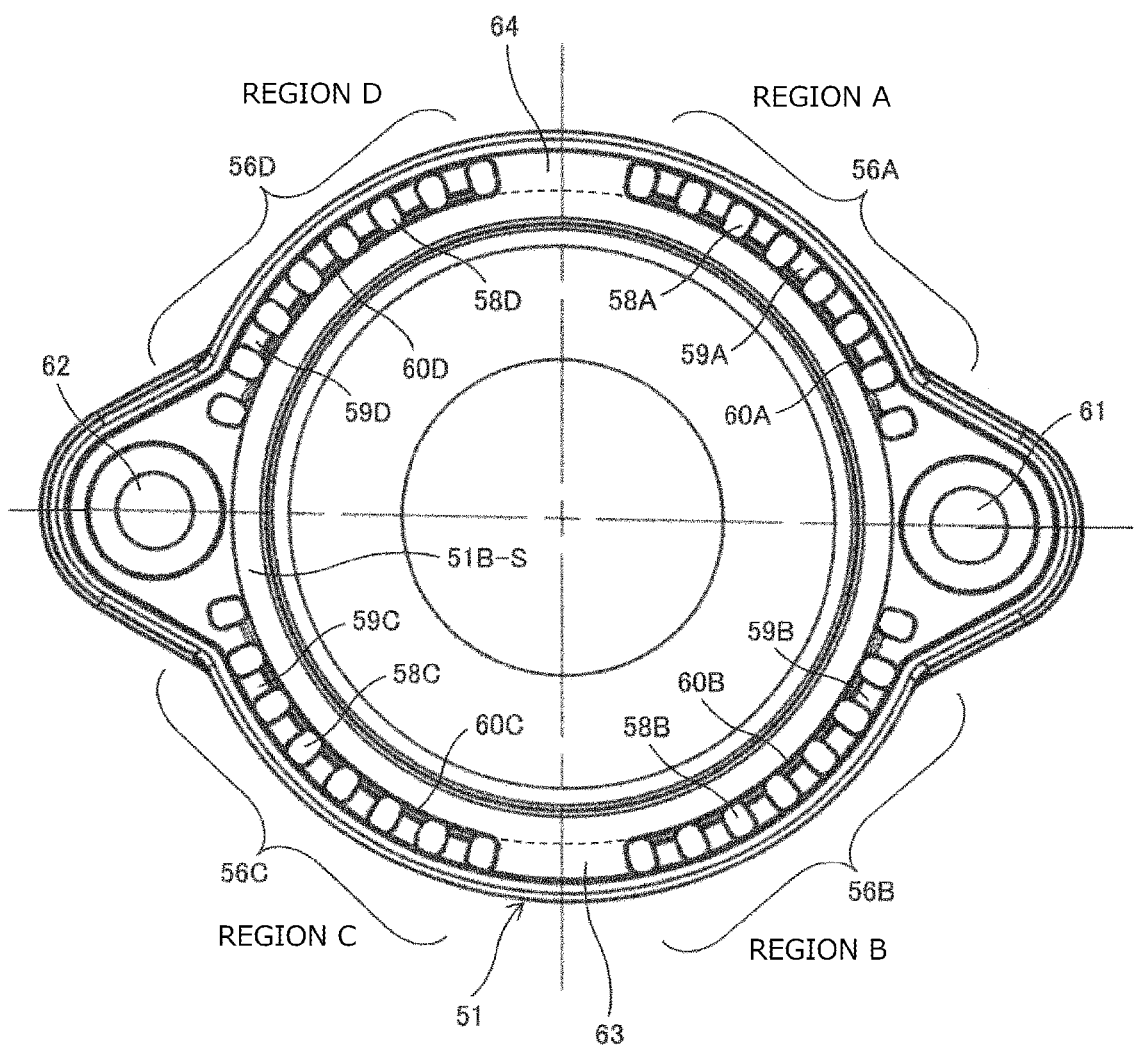
FIG. 6 is a front view of the second sensor housing shown in FIG. 5 when viewed from the opening surface side thereof.

In each of FIG. 5 and FIG. 6, a second accommodation space 53 is formed inside the second sensor housing 51, and the annular distal end seal portion 51B-S formed on the distal end of the second seal holding portion 51B is formed on the end surface on the radially outside of the second accommodation space 53.

In addition, on the radially outside of the annular distal end seal portion 51B-S, a first recessed space part 56A, a second recessed space part 56B, a third recessed space part 56C and a fourth recessed space part 56D are disposed on the same circumferential surface at 90° intervals. That is, the recessed space parts 56A to 56D are disposed on respective four regions (region A to region D) obtained by dividing the annular distal end seal portion 51B-S into four parts.

The recessed space parts 56A to 56D disposed on the respective regions are formed of a plurality of unit recessed space portions 58A, unit recessed space portions 58B, unit recessed space portions 58C and unit recessed space portions 58D respectively. For example, the first recessed space part 56A of the region A is formed of eight unit recessed space portions 58A, and the unit recessed space portions 58A are arranged along the annular distal end seal portion 51B-S at predetermined angular intervals. Therefore a partition wall portion 59A exists between each adjacent pair of unit recessed space portions 58A. This partition wall portion 59A contributes to secure strength (rigidity) of the first recessed space part 56A. The other recessed space parts 56B to 56D are also formed with unit recessed space portions 58B to 58D and partition wall portions 59B to 59D respectively.

In addition, the recessed space part 56A includes at least a first unit recessed space portion 58A, a second unit recessed space portion 58A, a third unit recessed space portion 58A, a first partition wall portion 59A and a second partition wall portion 59A. The recessed space part 56B includes at least a first unit recessed space portion 58B, a second unit recessed space portion 58B, a third unit recessed space portion 58B, a first partition wall portion 59B and a second partition wall portion 59B. The recessed space part 56C includes at least a first unit recessed space portion 58C, a second unit recessed space portion 58C, a third unit recessed space portions 580, a first partition wall portion 59C and a second partition wall portion 59C. The recessed space part 56D includes at least a first unit recessed space portion 58D, a second unit recessed space portion 58D, a third unit recessed space portion 58D, a first partition wall portion 59D and a second partition wall portion 59D. In the circumferential direction of the rotation axis S of the steering shaft 4, the first unit recessed space portions 58A to 58D, the first partition wall portions 59A to 59D, the second unit recessed space portions 58A to 58D, the second partition wall portions 59A to 59D and the third unit recessed space portions 58A to 58D are provided in this order.

Three or more unit recessed space portions may be provided to each of them, and as shown in FIG. 5, each of the recessed space parts 56A to 56D is formed with eight unit recessed space portions.

Moreover, the first partition wall portions 59A to 59D each have a shape protruding toward the direction of the first sensor housing body 50A in the direction of the rotation shaft S of the steering shaft 4, and the first partition wall portion 59A partitions the first unit recessed space portion 58A and the second unit recessed space portion 58A, the first partition wall portion 59B partitions the first unit recessed space portion 58B and the second unit recessed space portion 58B, the first partition wall portion 59C partitions the first unit recessed space portion 58C and the second unit recessed space portion 58C, and the first partition wall portion 59D partitions the first unit recessed space portion 58D and the second unit recessed space portion 58D. In addition, the second partition wall portions 59A to 59D each have a shape protruding toward the direction of the first sensor housing body 50A in the direction of the rotation shaft S of the steering shaft 4, and the second partition wall portion 59A partitions the second unit recessed space portion 58A and the third unit recessed space portion 58A, the second partition wall portion 59B partitions the second unit recessed space portion 58B and the third unit recessed space portion 58B, the second partition wall portion 59C partitions the second unit recessed space portion 58C and the third unit recessed space portion 58C, and the second partition wall portion 59D partitions the second unit recessed space portion 58D and the third unit recessed space portion 58D.

In such a configuration, by providing at least the first and second partition wall portions 59A to 59D, the rigidity of the recessed space parts 56A to 56D can be improved.

In addition, as shown in FIG. 4, in the direction of the rotation axis S of the steering shaft 4, there is a step having a length (L) between the seal surface of the annular distal end seal portion 51B-S and the opening surface of the recessed space 56, and the distal end seal portion 51B-S is formed such that the distance between the distal end seal portion 51B-S and the seal portion 50B-S of the first sensor housing 50 is closer than that between the opening surface and the seal portion 50B-S.

That is, in the direction of the rotation axis S of the steering shaft 4, the distal end seal portion 51B-S protrudes toward the seal portion 50B-S of the first sensor hosing 50 more than the first and second partition wall portions 59A to 59D. Consequently, since the first and second partition wall portions 59A to 59D are set back to the second sensor housing 51 side from the distal end seal portion 51B-S, the contact between the distal end seal portion 51B-S and the seal portion 50B-S is not inhibited, and thereby sealing performance can be maintained.

In addition, in a case where the plastic deformation of the distal end seal portion 51B-S proceeds, the first and second partition wall portions 59A to 59D come in contact with the seal portion 50B-S of the first sensor housing 50, and thereby the shape of the second sensor housing 51 can be maintained.

In FIG. 4 and FIG. 6, in the unit recessed space portions 58A to 58D respectively forming the recessed space parts 56A to 56D, the unit recessed space portions 58A are connected to each other by a communication groove 60A, the unit recessed space portions 58B are connected to each other by a communication groove 60B, the unit recessed space portions 58C are connected to each other by a communication groove 60C, and the unit recessed space portions 58D are connected to each other by a communication groove 60D. The communication groove 60A is formed passing through the partition wall portions 59A, each of which partitions between adjacent unit recessed space portions 58A, the communication groove 60B is formed passing through the partition wall portions 59B, each of which partitions between adjacent unit recessed space portions 58B, the communication groove 60C is formed passing through the partition wall portions 59C, each of which partitions between adjacent unit recessed space portions 58D, and the communication groove 60D is formed passing through the partition wall portions 59D, each of which partitions between adjacent unit recessed space portions 58D. These communication grooves 60A to 60D are each formed in a circular arc shape, and are each arranged close to the rotation axis S of the steering shaft 4. With this, by connecting the unit recessed space portions 58A to each other, connecting the unit recessed space portions 58B to each other, connecting the unit recessed space portions 58C to each other, and by connecting the unit recessed space portions 58D to each other by corresponding ones of communication grooves 60A to 60D, discharge performance of moisture infiltrated into each of the recessed spaces 56A to 56D can be improved.

In addition, a first bolt boss portion 61 and a second bolt boss portion 62 are respectively formed between the first recessed space part 56A and the second recessed space part 56B and between the third recessed space part 56C and the fourth recessed space part 56D. Fixing bolts which are not shown in the drawings are inserted into the bolt boss portions 61 and 62 and are screwed with screw portions (not shown in the drawings) provided to the first sensor housing body 50A, and the first sensor housing 50 and the second housing sensor 51 are firmly fixed to each other.

The skirt portion 57 is formed at the entire circumference of the second sensor housing 51, including the outer sides of the first bolt boss portion 61 and the second bolt boss portion 62 in the radial direction to the rotation axis S of the steering shaft 4. Consequently, deterioration of fastening axial force of first and second bolts caused by infiltrating moisture into the seat surfaces of the first and second bolt boss portions 61 and 62 can be suppressed.

Moreover, a first enlarged seal portion (second seal portion) 63 and a second enlarged seal portion (third seal portion) 64, which are radially enlarged, are respectively formed between the second recessed space part 56B and the third recessed space part 56C and between the fourth recessed space part 56D and the first recessed space part 56A. These enlarged seal portions 63 and 64 are formed so as to be adjacent to the outer peripheral side of the annular distal end seal portion 51B-S, and the enlarged seal portions 63 and 64 and the annular distal end seal portion 51B-S are integrally formed at the distal end surface of the second seal holding portion 51B.

In addition, in the following, as shown in FIG. 5, the entire arrangement relation of the recessed space parts 56A to 56D, the bolt boss portions 61 and 62, the distal end seal portion 51B-S and the enlarged seal portions 63 and 64 will be shown.

The first bolt boss portion 61 and the second bolt boss portion 62 are provided at respect positions separated from each other (for example, at an angular interval of 180°) in the circumferential direction to the rotation axis S of the steering shaft 4, and divide the recessed space parts 56A to 56D into two regions of a first region (region A, region D) and a second region (region B and region C).

In addition, the first region includes the first recessed space part 56A and the fourth recessed space part 56D, and the second region includes the second recessed space part 56B and the third recessed space part 56C.

In addition, the seal part includes the distal end seal portion (first seal portion) 51B-S, the first enlarged seal portion (second seal portion) 63 and the second enlarged seal portion (third seal portion) 64.

Moreover, the distal end seal portion 51B-S has an annular shape and is provided more on the inner side than the recessed space parts 56A to 56D in the radial direction to the rotation axis S of the steering shaft 4, the first enlarged seal portion 63 is provided between the second recessed space part 56B and the third recessed space part 56C in the circumferential direction to the rotation axis S of the steering shaft 4, and the second enlarged seal portion 64 is provided between the first recessed space part 56A and the fourth recessed space part 56D in the circumferential direction to the rotation axis S of the steering shaft 4.

In such a configuration, in the second sensor housing 51, by providing the first and second enlarged seal portions 63 and 64 to positions at which balancing can be achieved in the circumferential direction with respect to the parts to be received the axial force by the fastening of the first and second bolts, the shape of the sensor housing 51 can be appropriately maintained even in a case where the axial force by the first and second bolts is applied.

In this way, according to the first embodiment, in a case where moisture, such as rainwater and salt water, infiltrates from the gap between the first sensor housing and the second sensor housing, the moisture is stored and held in the recessed space parts once, and thereby the infiltrating of the moisture to the seal ring is suppressed, and a housing structure having a high liquid-tight performance can be obtained.

Second Embodiment

Next, a second embodiment of the present invention will be explained. In the first embodiment, the distal end seal portion 51B-S is formed on the distal end side of the second seal holding portion 51B, and the sectional shape thereof which is cut along the plane surface in the direction of the rotation axis S which passes through the rotation axis S is formed in a substantially rectangular shape. In contrast to this, in the second embodiment, the sectional shape which is cut along the plane in the direction of the rotation axis S is formed in a shape having a sharp tip.

Figure 7:
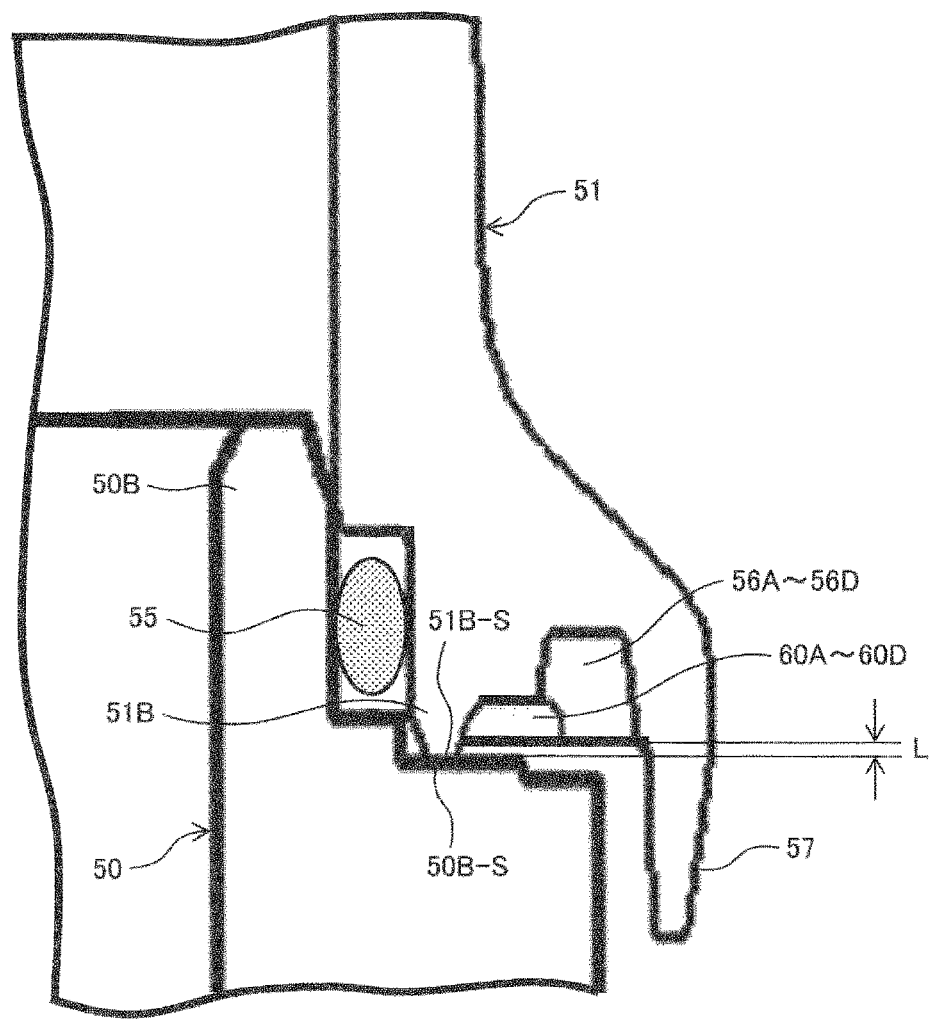
FIG. 7 is an enlarged sectional view of a part corresponding to the part P of FIG. 3 that is a second embodiment.
Figure 8:
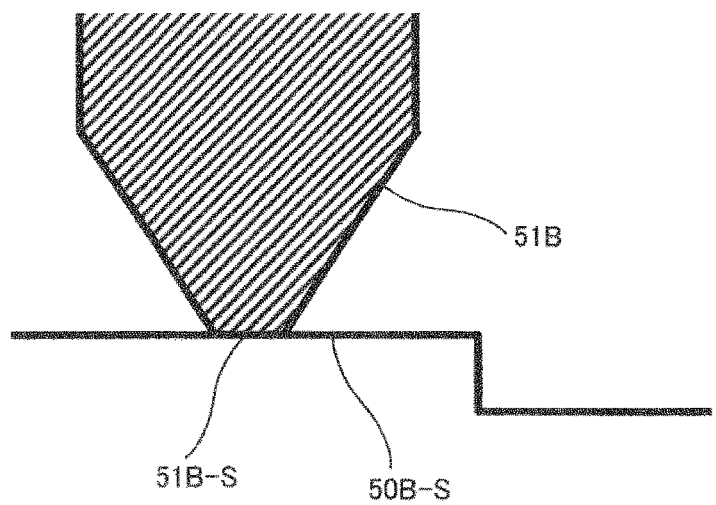
FIG. 8 is a sectional view schematically showing a second seal holding portion shown in FIG. 7.

In FIG. 7 and FIG. 8, the sectional shape in the direction of the rotation axis S on the distal end side of the second seal holding portion 51B is formed in a trapezoidal shape or a triangular shape. With this, when the second sensor housing 51 is fixed to the first sensor housing 50 by the fixing bolts, a load per unit area of the distal end side of the second seal holding portion 51B can be set large, and consequently, the distal end side of the second seal holding portion 51B which is formed in a trapezoidal shape or a triangular shape is plastically deformed and compressed easily. Thus, sealing performance can be further improved.

Figure 9:
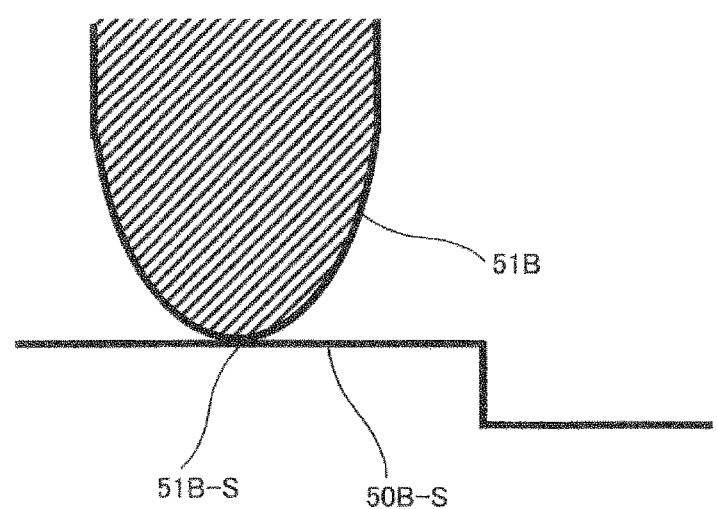
FIG. 9 is a sectional view schematically showing a variation of the second seal holding portion shown in FIG. 7.

Moreover, FIG. 9 shows a variation of FIG. 8, and the sectional shape in the direction of the rotation axis S on the distal end side of the second seal holding portion 51B is formed in an arc shape. As the arc shape, an arc part in an ellipse or an arc part in a perfect circle may be used. Similarly, by using such an arc shape, a load per unit area on the distal end side of the second seal holding portion 51B can be set large, and consequently, the distal end side of the second seal holding portion 51B which is formed in an arc shape is plastically deformed and compressed easily. Thus, sealing performance can be further improved.

As mentioned above, in the present invention, in a state in which a first seal holding portion is formed to a first sensor housing and a second seal holding portion is formed to a second housing, and the first sensor housing is combined with the second sensor housing, a seal ring is held between the first seal holding portion and the second seal holding portion, and a recessed space part for storing and holding moisture is formed on the radial outer side of the second seal holding portion when viewed in the rotation axis of a steering shaft.

According to this configuration, in a case where moisture, such as rainwater and salt water, infiltrates from the gap between the first housing member and the second housing member, the moisture is stored and held in the recessed space parts once, and thereby the infiltrating of the moisture to the seal member is suppressed, and a housing structure having a high liquid-tight performance can be obtained.

In addition, the present invention is not limited to the above embodiments, and various variations are included. For example, the above embodiments explained in detail are one for facilitating understanding of the present invention easily, and are always not limited to one including all of the configurations explained above. In addition, a part of a configuration of one embodiment can be replaced to a configuration of the other embodiment, and moreover, the configuration of the other embodiment can be added to the configuration of one embodiment. In addition, deletion, addition and replacement of another configuration to a part of the configuration of each of the embodiments can be possible.

The entire contents of Japanese Patent Application 2018-171211 filed Sep. 13, 2018 is incorporated herein by reference.

The invention claimed is:

1. A housing structure for a steering apparatus, comprising:
   a first housing member including a first housing body and a first housing seal member holding portion; and
   a second housing member made of resin material, and including a second housing body, a second housing seal member holding portion and a recessed space,
   wherein the first housing body has a cylindrical shape, and includes a first equipment accommodation space thereinside,
   wherein the first equipment accommodation space accommodates a part of a steering shaft,
   wherein the first housing seal member holding portion has a cylindrical shape, and is provided to the first housing body,
   wherein the second housing body has a cylindrical shape, and includes a second equipment accommodation space thereinside,
   wherein the second equipment accommodation space accommodates a part of the steering shaft provided so as to be rotatable in an inside of the second equipment accommodation space,
   wherein the second housing seal member holding portion has a cylindrical shape, and the first housing seal member holding portion is inserted thereinside, and the second housing seal member holding portion holds an annular seal member between the first housing seal member holding portion and the second housing seal member holding portion in a radial direction to a rotation axis of the steering shaft, and
   wherein the recessed space is provided more on an outer side than the second housing seal member holding portion in the radial direction to the rotation axis of the steering shaft, and has a shape opening toward the first housing member in a direction of the rotation axis of the steering shaft.

2. The housing structure for the steering apparatus according to claim 1, wherein the second housing member is provided with a seal part, and
   wherein the seal part is provided between the second housing seal member holding portion and the recessed space in the radial direction to the rotation axis of the steering shaft, and seals between the first housing member and the second housing member by being brought into contact with the first housing member.

3. The housing structure for the steering apparatus according to claim 2, wherein, in a state in which the second housing member is combined with the first housing member, the seal part is plastically deformed.

4. The housing structure for the steering apparatus according to claim 3, wherein the seal part has a shape protruding toward the first housing member in the direction of the rotation axis of the steering shaft.

5. The housing structure for the steering apparatus according to claim 2, wherein the recessed space includes at least a first unit recessed space portion, a second unit recessed space portion, a third unit recessed space portion, a first partition wall portion and a second partition wall portion, and in a circumferential direction to the rotation axis of the steering shaft, the first unit recessed space portion, the first partition wall portion, the second unit recessed space portion, the second partition wall portion and the third unit recessed space portion are arranged in this order,
   wherein, in the direction of the rotation axis of the steering shaft, the first partition wall portion has a shape protruding toward a direction of the first housing member, and is configured to partition the first unit recessed space portion and the second unit recessed space portion, and
   wherein, in the direction of the rotation axis of the steering shaft, the second partition wall portion has a shape protruding toward the direction of the first housing member, and is configured to partition the second unit recessed space portion and the third unit recessed space portion.

6. The housing structure for the steering apparatus according to claim 5, wherein the seal part protrudes more than the first partition wall portion and the second partition wall portion toward the first housing member in the direction of the rotation axis of the steering shaft.

7. The housing structure for the steering apparatus according to claim 2, wherein the recessed space includes a first unit recessed space portion, a second unit recessed space portion, a third unit recessed space portion, a first partition wall portion, a second partition wall portion and a communication groove, and in a circumferential direction to the rotation axis of the steering shaft, the first unit recessed space portion, the first partition wall portion, the second unit recessed space portion, the second partition wall portion and the third unit recessed space portion are arranged in this order,
   wherein, in the direction of the rotation axis of the steering shaft, the first partition wall portion has a shape protruding toward a direction of the first housing member, and is configured to partition the first unit recessed space portion and the second unit recessed space portion,
   wherein, in the direction of the rotation axis of the steering shaft, the second partition wall portion has a shape protruding toward the direction of the first housing member, and is configured to partition the second unit recessed space portion and the third unit recessed space portion, and
   wherein, in the circumferential direction to the rotation axis of the steering shaft, the communication groove communicates the first unit recessed space portion with the second unit recessed space portion, and communicates the second unit recessed space portion with the third unit recessed space portion.

8. The housing structure for the steering apparatus according to claim 7, wherein the recessed space includes at least a first recessed space part, a second recessed space part, a third recessed space part and a fourth recessed space part,
wherein the second housing member includes a first bolt boss portion and a second bolt boss portion,
wherein a first bolt and a second bolt for fixing the first housing member to the second housing member are respectively inserted into the first bolt boss portion and the second bolt boss portion,
wherein, in the circumferential direction to the rotation axis of the steering shaft, the first bolt boss portion and the second bolt boss portion are provided at positions separated from each other, and a line segment connecting the first bolt boss portion and the second bolt boss portion divides the four recessed space parts into a first region and a second region,
wherein the first region includes the first recessed space part and the fourth recessed space part,
wherein the second region includes the second recessed space part and the third recessed space part,
wherein the seal part includes a first seal portion, a second seal portion and a third seal portion,
wherein the first seal portion has an annular shape, and is provided more on an inner side than the recessed space, in the radial direction to the rotation axis of the steering shaft,
wherein the second seal portion is provided between the second recessed space part and the third recessed space part, in the circumferential direction to the rotation axis of the steering shaft, and
wherein the third seal portion is provided between the fourth recessed space part and the first recessed space part, in the circumferential direction to the rotation axis of the steering shaft.

9. The housing structure for the steering apparatus according to claim 2, wherein each of the first housing seal member holding portion and the second housing seal member holding portion comes in contact with the seal member in the radial direction to the rotation axis of the steering shaft.

10. The housing structure for the steering apparatus according to claim 1, wherein the second housing member includes a skirt portion, and
wherein the skirt portion is provided more on an outer side than the recessed space in the radial direction to the rotation axis of the steering shaft, and has a shape protruding toward the first housing member in the direction of the rotation axis of the steering shaft.

11. The housing structure for the steering apparatus according to claim 10, wherein the second housing member includes a first bolt boss portion and a second bolt boss portion,
wherein a first bolt and a second bolt for fixing the first housing member and the second housing member are respectively inserted into the first bolt boss portion and the second bolt boss portion, and
wherein the skirt portion has a shape surrounding outer sides of the first bolt boss portion and the second bolt boss portion in the radial direction to the rotation axis of the steering shaft.

12. The housing structure for the steering apparatus according to claim 10, wherein a sectional shape of the steering shaft in a plane including the rotation axis of the steering shaft is formed in a shape becoming thinner as a distance to the first sensor housing member decreases, in the direction of the rotation axis of the steering shaft.

* * * * *